United States Patent
White et al.

(10) Patent No.: US 8,411,210 B2
(45) Date of Patent: *Apr. 2, 2013

(54) SYSTEMS AND METHODS FOR CONFIGURATION OF A REMOTE CONTROL DEVICE

(75) Inventors: James Matthew White, Denver, CO (US); Luke Vanduyn, Highlands Ranch, CO (US); Henry Gregg Martch, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 1118 days.

This patent is subject to a terminal disclaimer.

(21) Appl. No.: 12/241,550

(22) Filed: Sep. 30, 2008

(65) Prior Publication Data

US 2010/0079680 A1 Apr. 1, 2010

(51) Int. Cl.
*H04N 5/44* (2011.01)

(52) U.S. Cl. .................... 348/734; 340/12.25

(58) Field of Classification Search .............. 348/734, 348/725; 340/12.25, 12.26, 12.28, 12.5
See application file for complete search history.

(56) References Cited

U.S. PATENT DOCUMENTS

| | | | |
|---|---|---|---|
| 4,450,477 A | 5/1984 | Lovett | |
| 5,545,857 A | 8/1996 | Lee et al. | |
| 5,559,961 A | 9/1996 | Blonder | |
| 5,585,866 A | 12/1996 | Miller et al. | |
| 5,594,509 A | 1/1997 | Florin et al. | |
| 5,602,597 A | 2/1997 | Bertram | |
| 5,754,258 A | 5/1998 | Hanaya et al. | |
| 5,805,235 A | 9/1998 | Bedard | |
| 6,005,565 A | 12/1999 | Legall | |
| 6,008,735 A | 12/1999 | Chiloyan et al. | |
| 6,020,930 A | 2/2000 | Legrand | |
| 6,118,498 A | 9/2000 | Reitmeier | |
| 6,147,714 A | 11/2000 | Terasawa et al. | |
| 6,334,217 B1 | 12/2001 | Kim | |
| 6,526,577 B1 | 2/2003 | Knudson et al. | |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

International Searching Authority, European Patent Office, "International Search Report," mailed Dec. 7, 2009; International Application No. PCT/US2009/058457, filed Sep. 25, 2009.

(Continued)

*Primary Examiner* — Michael Lee
(74) *Attorney, Agent, or Firm* — Ingrassia Fisher & Lorenz, P.C.

(57) ABSTRACT

A remote control device establishes a bi-directional communication with a television receiver and uploads a set of remote control codes associated with a target component selected by the user. One method includes storing, within a television receiver, a set of remote control codes associated with a corresponding set of component types; presenting a component-selection user interface; receiving a target component type selected from the set of component types presented by the component-selection user interface; determining, from the set of remote control codes, a target remote control code associated with the target component type; and transmitting the target remote control code to the remote control device.

17 Claims, 4 Drawing Sheets

U.S. PATENT DOCUMENTS

| | | | |
|---|---|---|---|
| 6,650,248 | B1 | 11/2003 | O'Donnell et al. |
| 6,750,803 | B2 | 6/2004 | Yates et al. |
| 6,804,824 | B1 | 10/2004 | Potrebic et al. |
| 6,882,712 | B1 | 4/2005 | Iggulden et al. |
| 7,046,161 | B2 * | 5/2006 | Hayes .................. 340/12.25 |
| 7,096,489 | B2 * | 8/2006 | Kitsukawa et al. ........... 725/109 |
| 7,225,456 | B2 | 5/2007 | Kitsukawa et al. |
| 7,434,246 | B2 | 10/2008 | Florence |
| 7,584,492 | B2 | 9/2009 | Terakado et al. |
| 2001/0011953 | A1 | 8/2001 | Shintani et al. |
| 2001/0017672 | A1 | 8/2001 | Verhaeghe |
| 2002/0097229 | A1 | 7/2002 | Rose et al. |
| 2002/0122079 | A1 | 9/2002 | Kamen et al. |
| 2002/0191954 | A1 | 12/2002 | Beach et al. |
| 2003/0066079 | A1 | 4/2003 | Suga |
| 2003/0191947 | A1 | 10/2003 | Stubblefield et al. |
| 2003/0193426 | A1 | 10/2003 | Vidal |
| 2004/0041723 | A1 | 3/2004 | Shibamiya et al. |
| 2004/0070593 | A1 | 4/2004 | Neely et al. |
| 2004/0172651 | A1 | 9/2004 | Wasilewski et al. |
| 2004/0218905 | A1 | 11/2004 | Green et al. |
| 2004/0230843 | A1 | 11/2004 | Jansen |
| 2004/0255336 | A1 | 12/2004 | Logan et al. |
| 2005/0010949 | A1 | 1/2005 | Ward et al. |
| 2005/0110651 | A1 * | 5/2005 | Martis et al. ............. 340/825.69 |
| 2005/0188402 | A1 | 8/2005 | de Andrade et al. |
| 2005/0268100 | A1 | 12/2005 | Gasparini et al. |
| 2006/0037047 | A1 | 2/2006 | DeYonker et al. |
| 2006/0051058 | A1 | 3/2006 | Rudolph et al. |
| 2006/0084409 | A1 | 4/2006 | Ghadiali |
| 2006/0095401 | A1 | 5/2006 | Krikorian et al. |
| 2007/0039019 | A1 | 2/2007 | Collier |
| 2007/0061724 | A1 | 3/2007 | Slothouber et al. |
| 2007/0079334 | A1 | 4/2007 | Silver |
| 2007/0130607 | A1 | 6/2007 | Thissen et al. |
| 2007/0277224 | A1 | 11/2007 | Osborn et al. |
| 2008/0010518 | A1 | 1/2008 | Jiang et al. |
| 2008/0024682 | A1 | 1/2008 | Chen |
| 2008/0034314 | A1 | 2/2008 | Louch et al. |
| 2008/0052245 | A1 | 2/2008 | Love |
| 2008/0088495 | A1 | 4/2008 | Kawakita |
| 2008/0231762 | A1 | 9/2008 | Hardacker et al. |
| 2009/0007209 | A1 | 1/2009 | Kawai |
| 2009/0031343 | A1 | 1/2009 | Sharkey |
| 2010/0100909 | A1 | 4/2010 | Arsenault et al. |
| 2010/0169958 | A1 | 7/2010 | Werner et al. |

FOREIGN PATENT DOCUMENTS

| | | |
|---|---|---|
| WO | 0001142 A1 | 1/2000 |
| WO | 0178054 A1 | 10/2001 |
| WO | 0178383 A2 | 10/2001 |
| WO | 03043320 A2 | 5/2003 |
| WO | 2006119269 A2 | 11/2006 |
| WO | 2006127211 A2 | 11/2006 |
| WO | 2007015047 A2 | 2/2007 |

OTHER PUBLICATIONS

International Searching Authority, European Patent Office, "International Search Report and Written Opinion," mailed Dec. 18, 2009; International Application No. PCT/US2009/058456, filed Sep. 25, 2009.

International Searching Authority, European Patent Office, "International Search Report," mailed Jan. 20, 2010; International Application No. PCT/US2009/057825, filed Sep. 22, 2009.

USPTO "Non-Final Office Action" mailed Nov. 24, 2010; U.S. Appl. No. 12/242,587, filed Sep. 30, 2008.

USPTO "Non-Final Office Action" mailed Jan. 12, 2011; U.S. Appl. No. 12/241,580, filed Sep. 30, 2008.

USPTO "Non-Final Office Action" mailed Jan. 28, 2011; U.S. Appl. No. 12/236,430, filed Sep. 23, 2008.

USPTO "Non-Final office Action" mailed Feb. 4, 2011; U.S. Appl. No. 12/241,599, filed Sep. 30, 2008.

USPTO "Non-Final Office Action" mailed Feb. 9, 2011; U.S. Appl. No. 12/241,608, filed Sep. 30, 2008.

International Searching Authority, European Patent Office, "International Search Report," mailed Feb. 4, 2010; International Application No. PCT/US2009/058937, filed Sep. 30, 2009.

International Searching Authority, European Patent Office, "International Search Report," mailed Feb. 16, 2010; International Application No. PCT/US2009/057582, filed Sep. 18, 2009.

Wightman, Robert Edward "Methods and Apparatus for Providing Multiple Channel Recall on a Television Receiver," U.S. Appl. No. 12/233,274, filed Sep. 18, 2008.

Minnick, Danny Jean et al., "Graphical Interface Navigation Based on Image Element Proximity," U.S. Appl. No. 12/609,860, filed Oct. 30, 2009.

White, James Matthew et al. "Systems and Methods for Graphical control of User Interface Features Provided by a Television Receiver," U.S. Appl. No. 12/241,556, filed Sep. 30, 2008.

Vanduyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of An Electronic Program Guide," U.S. Appl. No. 12/241,608, filed Sep. 30, 2008.

Vanduyn, Luke et al. "Methods and Apparatus for Presenting Supplemental Information in an Electronic Programming Guide," U.S. Appl. No. 12/235,476, filed Sep. 22, 2008.

Vanduyn, Luke et al. "Methods and Apparatus for Providing Multiple Channel Recall on a Television Receiver," U.S. Appl. No. 12/242,587, filed Sep. 30, 2008.

Taxier, Karen Michelle et al. "Methods and Apparatus for Visually Displaying Recording Timer Information," U.S. Appl. No. 12/235,464, filed Sep. 22, 2008.

Martch, Henry Gregg et al. "Methods and Apparatus for Locating Content in an Electronic Programming Guide," U.S. Appl. No. 12/242,614, filed Oct. 17, 2008.

Taxier, Karen Michelle et al. "Apparatus and Methods for Dynamic Pictorial Image Authentication," U.S. Appl. No. 12/236,430, filed Sep. 23, 2008.

Wikipedia, the free encyclopedia, "Dashboard (Software)," Retrieved from the Internet on Oct. 6, 2008, http://en.wikipedia.org/w/index.php?title=Dashboard2software)&printable=yes.

Nintendo, "Wii Operations Manual System Setup," 2007.

European Patent Office, International Searching Authority, "International Search Report and Written Opinion," mailed Dec. 21, 2009; International Application No. PCT/US2009/058454 filed Sep. 25, 2009.

Anonymous "ZigBee," Wikipedia, the Free Encyclopedia [online], Sep. 26, 2008, XP002558439; retrieved from the Internet: <URL:http://en.wikipedia.org/w/index.php?title=ZigBee&oldid=241085798> [retrieved on Dec. 2, 2009].

USPTO "Notice of Allowance" mailed Oct. 24, 2011; U.S. Appl. No. 12/242,089, filed Sep. 30, 2008.

USPTO "Non-Fnial Office Action" mailed Jun. 28, 2011; U.S. Appl. No. 12/242,089, filed Sep. 30, 2008.

* cited by examiner

SYSTEMS AND METHODS FOR CONFIGURATION OF A REMOTE CONTROL DEVICE

TECHNICAL FIELD

The present invention generally relates to the control of television receiver devices, and more particularly relates to systems and methods for providing and configuring remote control device for use with such television receiver devices.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through conventional television broadcasts, or through cable, wireless or other media. Programming is typically received at a receiver such as a "set top box" (STB) or other receiver that demodulates the received signals and converts the demodulated content into a format that can be presented to the viewer on a television or other display. In addition to receiving and demodulating television programming, many television receivers are able to provide additional features. Examples of features available in many modern television receivers include electronic program guides (EPGs), digital or other personal video recorders, "place-shifting" features for streaming received content over a network or other medium, providing customer service information and/or the like.

Generally speaking, viewers interact with the STB or other receiver using some sort of user interface that receives inputs from a remote control or other input device. To change a channel, for example, the viewer typically depresses a "channel up/down" button, manually enters a number of a desired channel on a numeric keypad, and/or selects the new channel using a program guide feature of the receiver. The receiver then processes received viewer input to make desired changes to the on-screen display.

It is not unusual for a viewer's home entertainment system to include any number of different components produced by a variety of manufacturers. As a result, it is a non-trivial process to program or configure a remote control device to interact with each of the components within a system. Typically, this configuration process involves the user entering a complex series of keystrokes into the remote control device based on an often-incomplete set of codes provided in a printed manual.

Accordingly, it is therefore desirable to provide systems and methods for configuring a remote control device in a way that is simple and convenient for the user. These and other desirable features and characteristics will become apparent from the subsequent detailed description and the appended claims, taken in conjunction with the accompanying drawings and this background section.

BRIEF SUMMARY

According to various exemplary embodiments, systems and methods are provided for configuring a remote control device using bidirectional communication between a television receiver and the remote control device.

In accordance with one embodiment, a method for configuring a remote control device includes storing, within a television receiver, a set of remote control codes associated with a corresponding set of component types; presenting a component-selection user interface; receiving a target component type selected from the set of component types presented by the component-selection user interface; determining, from the set of remote control codes, a target remote control code associated with the target component type; and transmitting the target remote control code to the remote control device.

In accordance with further embodiments, the target remote control code is transmitted via a bi-directional data communication link (e.g., a ZigBee link) established between the remote control device and the television receiver.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, a remote control device is configured to control a target device by establishing bi-directional data communication with the television receiver (or set-top box), then, in response to user input, uploading to the remote control device one or more codes associated with the target device.

Although the various techniques and systems described herein may be used with any sort of remote control or command equipment, various embodiments may be particularly well suited for use with a remote control that includes a touchpad, scrollbar, rocker switch, scroll ring and/or other touch-sensitive input device.

Figure 1:
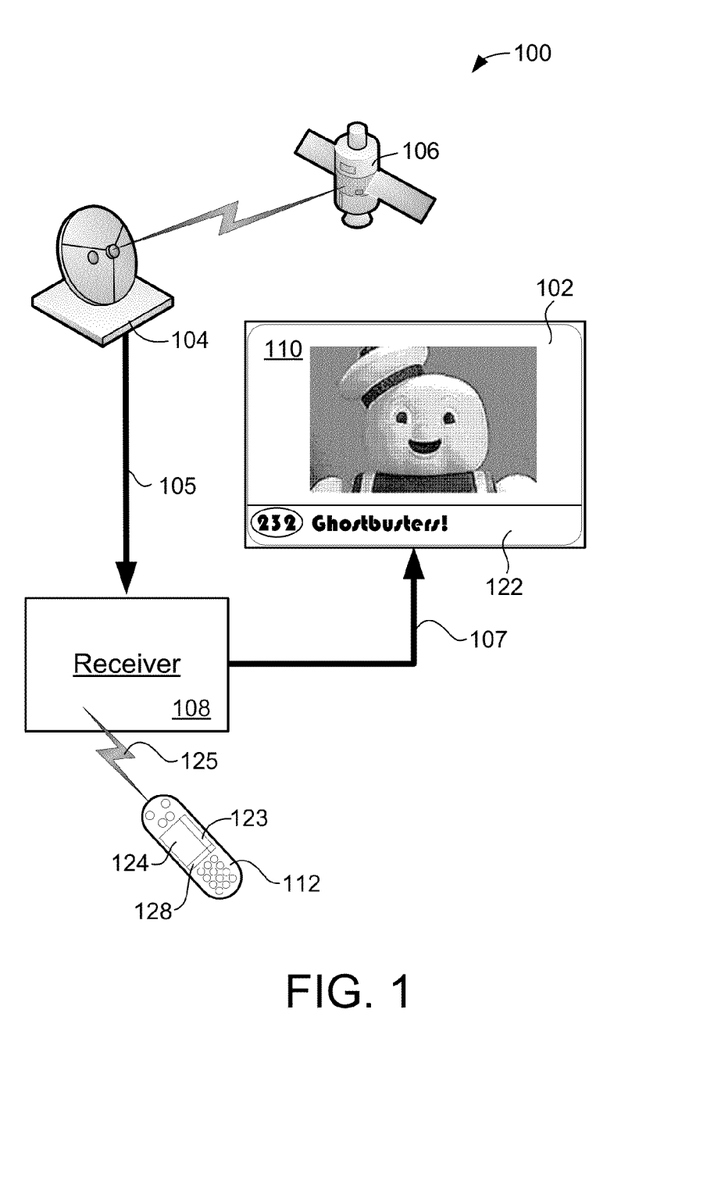
FIG. 1 is a block diagram of an exemplary television receiver system.

Turning now to the drawing figures and with initial reference to FIG. 1, an exemplary system 100 for presenting television signals to a viewer suitably includes a receiver 108 that receives signals 105 in any format and generates appropriate outputs 107 to generate imagery 110 on display 102. Typically, receiver 108 interacts with signals 125 received from a wireless remote control 112 to present television imagery 110 on display 102 as desired by the viewer. In the exemplary view shown in FIG. 1, imagery 110 has a superimposed program guide window 122 that provides electronic program guide (EPG) information about the currently-viewed program. To change the channel, a viewer typically uses an input feature (e.g., a touchpad, rocker switch or the like) on a remote control 112 to scroll the information displayed in window 122 until information about the desired program is presented. Receiver 108 then tunes the selected program as desired.

Receiver 108 is any component, device or logic capable of receiving and decoding video signals 105. In various embodiments, receiver 108 is a set-top box (STB) or the like capable of receiving satellite, cable, broadcast and/or other signals encoding audio/visual content. Receiver 108 may further demodulate or otherwise decode the received signals 105 to extract programming that can be locally viewed on display 102 as desired. Receiver 108 may also include a content database stored on a hard disk drive, memory, or other storage medium to support a digital or other personal video recorder (DVR/PVR) feature as appropriate. Receiver 108 may also provide place shifting, electronic program guide, multi-stream viewing and/or other features as appropriate.

In the exemplary embodiment illustrated in FIG. 1, receiver 108 is shown receiving digital broadcast satellite (DBS) signals 105 from a satellite 106 at an antenna 104. Equivalent embodiments, however, could receive programming 105 from one or more programming sources, including any sort of satellite, cable or broadcast source, as well as any Internet or other network source or the like. In embodiments that include DVR functionality, programming may be stored in any sort of database as desired (e.g., in response to user/viewer programming instructions) for subsequent viewing. Content may also be received from digital versatile disks (DVDs) or other removable media in some embodiments.

Display 102 is any device capable of presenting imagery to a viewer. In various embodiments, display 102 is a conventional television set, such as any sort of television operating in accordance with any digital or analog protocols, standards or other formats. Display 102 may be a conventional NTSC or PAL television receiver, for example. In other embodiments, display 102 is a monitor or other device that may not include built-in receiver functionality, but that is nevertheless capable of presenting imagery in response to signal 107 received from receiver 108. In various embodiments, receiver 108 and display 102 may be physically combined or interconnected in any manner. A receiver card, for example, could be inserted into a slot or other interface in a conventional television, or the functionality of receiver 108 may be provided within a conventional television display 102. In other embodiments, signals 107 are transferred between receiver 108 and display 102 using any sort of cable or other interface (including a wireless interface). Examples of common interfaces include, without limitation, component video, S-video, High-Definition Multimedia Interface (HDMI), Digital Visual Interface (DVI), IEEE 1394, and/or any other formats as desired.

Remote control 112 is any sort of control device capable providing signals 125 to receiver 108 that represent inputs received from one or more viewers. Typically, remote control 112 is an infrared, radio frequency (RF) or other wireless remote that includes any number of buttons or other features for receiving viewer inputs. In an exemplary embodiment, remote control 112 communicates with receiver 108 using the IEEE 802.15.4 ("ZIGBEE") protocol for wireless personal area networks (WPANs), although other embodiments may instead communicate using IEEE 802.15.1 ("BLUETOOTH"), IEEE 802.11 ("WI-FI"), conventional infrared, and/or any other wireless techniques. As will be discussed in further detail below, Remote control 112 is preferably configured to establish a bi-directional (two-way) communication link with receiver 108 for the purposes of uploading remote control codes.

Remote control 112 generally includes various buttons, sliders, rocker switches and/or other features for receiving physical inputs from the viewer. As the user depresses or otherwise interacts with the features, remote control 112 suitably produces wireless signals 125 in response. In further embodiments, remote control 112 includes a two-dimensional input device 124 that is able to receive inputs from the user in any multi-dimensional format (e.g, "X,Y", "r,Θ", and/or the like). Examples of two-dimensional input devices 124 that could be used in various embodiments include, without limitation, touchpads, directional pads, joysticks, trackballs, sets of arrows or other buttons, and/or the like. In a typical implementation, two-dimensional input device 124 provides coordinates or other signals 125 that indicate absolute (e.g., "X,Y") and/or relative (e.g., "ΔX, ΔY") movement in two or more dimensions. Such signals 125 may be decoded at controller 108 or elsewhere to coordinate the viewer's actions with respect to input device 124 to movement of cursor 114 or other features presented on display 102.

In the exemplary embodiment shown in FIG. 1, remote control 112 is illustrated with a touchpad-type device 124 that accepts viewer inputs applied with a finger, stylus or other object. FIG. 1 also shows touchpad device 124 as having dedicated scroll regions 123 and 128 for vertical and horizontal scrolling, respectively. Viewer movements within region 122 that are more-or-less parallel to the right edge of device 124, for example, could result in vertical scrolling, whereas movements within region 128 that are more-or-less parallel to the bottom edge of device 124 could result in horizontal scrolling. Dedicated scrolling regions 122, 128 are optional features, however, that may not be present in all embodiments. Further, scrolling could be implemented in any other manner. As noted above, it may be particularly beneficial to provide a smooth scrolling image to the viewer in response to inputs received on a touch sensitive device 124, although other features may benefit from improved scrolling as well.

In operation, then, receiver 108 suitably receives television signals 105 from a satellite, cable, broadcast or other source. In a satellite based embodiment, for example, one or more channels can be extracted from a conventional satellite feed; the video content on the selected channel can be demodulated, extracted and otherwise processed as appropriate to display the desired content to the viewer. One or more cable or broadcast channels may be similarly obtained in any manner. In some embodiments, receiver 108 may obtain multiple channel signals from different sources (e.g., one channel from a cable or satellite source and another channel from a terrestrial broadcast, DVD or other source).

Receiver 108 suitably obtains the desired content from the channel(s) indicated by the viewer, and presents the content on display 102. In various embodiments, channel changing is facilitates by presenting program guide window 122 superimposed upon (e.g., presented in a smaller window within) the imagery 110 obtained from the primary channel.

The viewer is able to interact with program guide window 122 in any manner. In various embodiments, the viewer is able to scroll the information contained within window 122 using remote control 112. The scrolling provided may be relatively smooth (e.g., providing a gradual progression of information across the window 122, as opposed to simply jumping through program guide entries) so that the viewer is able to better appreciate the "feel" and level of control provided by a scrolling input on remote 112. In some embodiments, program guide window 122 could be presented with a scroll bar or other feature that would graphically represent the location of the information presented in window 122 within the overall program guide. Other embodiments may contain additional features or enhancements of any sort.

Figure 2:
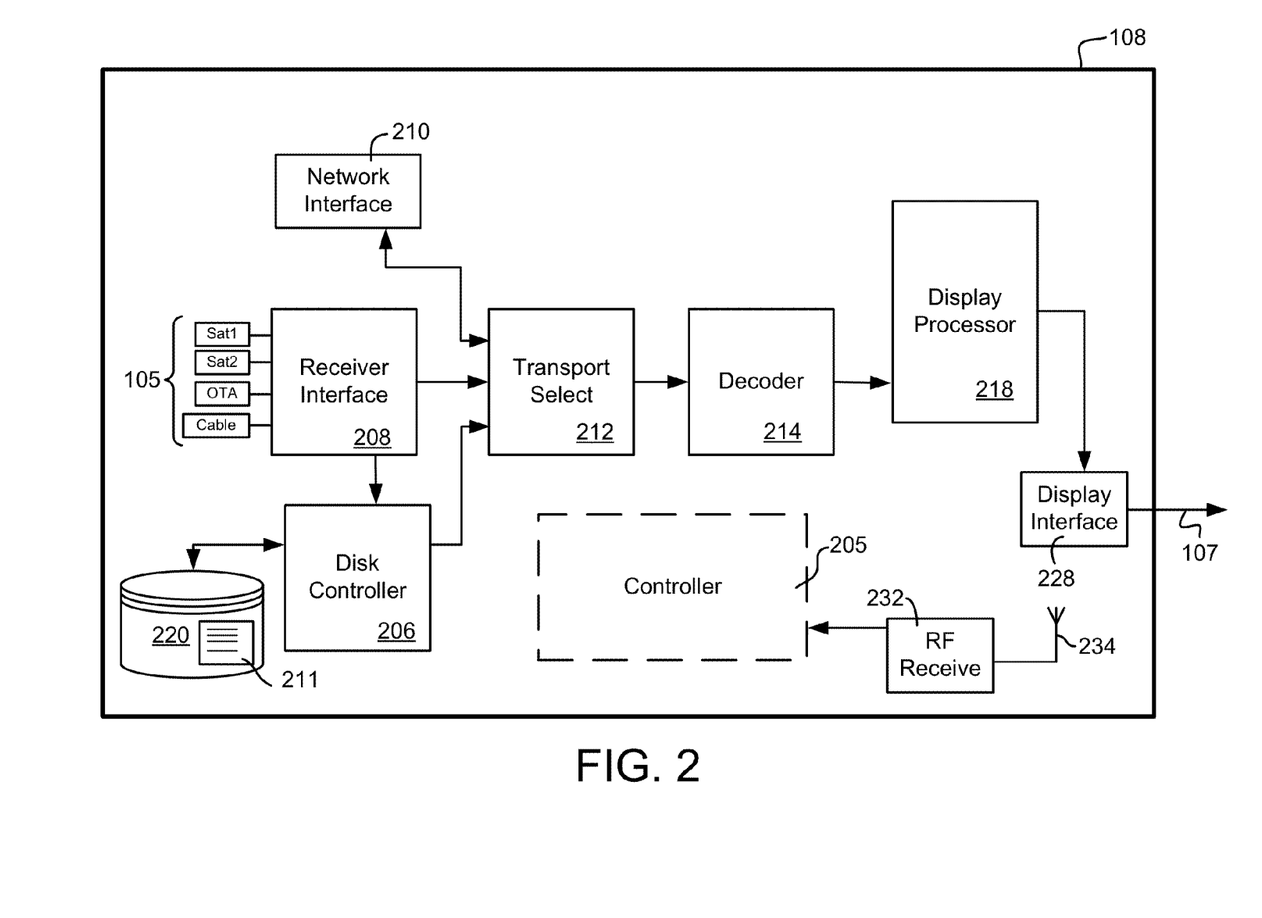
FIG. 2 is a block diagram of an exemplary television receiver device.

FIG. 2 provides additional detail about an exemplary receiver 108 that includes a receiver interface 208, a decoder 214 and a display processor 218, as appropriate. FIG. 2 also shows a disk controller interface 206 to a disk or other storage device 220, an interface 210 to a local or wide area network, a transport select module 212, a display interface 228, an RF receiver module and control logic 205. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Receiver 108 may be physically and logically implemented in any manner. FIG. 2 shows various logical and functional features that may be present in an exemplary device; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver interface 208, transport selector 212, decoder 214, display processor 218, disk controller 206 and/or other features, as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of receiver 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components of receiver 108. Various routines, methods and processes executed within receiver 108 are typically carried out under control of control logic 205, as described more fully below. Generally speaking, control logic 205 receives user input signals 125 (FIG. 1) via an RF receiver interface 232 that is able to communicate with the remote control 112 using a suitable antenna 234. Control logic receives user inputs from remote control 112 and/or any other source, and directs the other components of receiver 108 in response to the received inputs to present the desired imagery on display 102.

As noted above, receiver 108 suitably includes a receiver interface 208, which is any hardware, software, firmware and/or other logic capable of receiving media content via one or more content sources 105. In various embodiments, content sources 105 may include cable television, DBS, broadcast and/or other programming sources as appropriate. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide DVR functionality. In such embodiments, receiver 108 may also include a disk controller module 206 that interacts with an internal or external hard disk, memory and/or other device that stores content in a database 110, as described above.

In the embodiment shown in FIG. 2, receiver 108 also includes an appropriate network interface 210, which operates using any implementation of protocols or other features to support communication by receiver 108 on any sort of local area, wide area, telephone and/or other network. In various embodiments, network interface 210 supports conventional LAN, WAN or other protocols (e.g., the TCP/IP or UDP/IP suite of protocols widely used on the Internet) to allow receiver 108 to communicate on the Internet or any other network as desired. Network interface 210 typically interfaces with the network using any sort of LAN adapter hardware, such as a conventional network interface card (NIC) or the like provided within receiver 108. Other embodiments may provide interfaces 210 to conventional telephone lines or other communications channels, or may omit network connectivity altogether.

Storage device 220 is any sort of disk, memory or other digital storage media capable of storing programming, software instructions, data and/or other digital content as desired. In various embodiments, storage device 220 is capable of storing digitized program information as part of a PVR/DVR implementation. Storage device 220 may also include a database, look-up table, or other code file 211 comprising a set of remote control codes associated with various components. This file may be provided with the initial configuration of the receiver 108, for example, and/or may be updated in any manner. In various embodiments, file 211 is updated on any regular or irregular basis from a remote server communicating with receiver 108 via the programming signal 115 (e.g., the satellite, cable or other downlink signal), via a connection to the internet or another network, or via any other connection as desired. Although FIG. 2 shows file 211 as being stored on device 220, in practice file 211 may be stored in RAM, ROM, flash memory or other storage that is separate from DVR/PVR programming.

Transport stream select module 212 is any hardware and/or software logic capable of selecting a desired media stream from the available sources. In the embodiment shown in FIG. 2, stream select module 212 is able to generate video signals for presentation on one or more output interfaces 228. Typically, transport select module 212 responds to viewer inputs (e.g., via control logic 205) to simply switch encoded content received from a broadcast, satellite, cable or other source 105 or from storage 110 to one or more decoder modules 214.

Receiver 108 may include any number of decoder modules 214 for decoding, decompressing and/or otherwise processing received/stored content as desired. Generally speaking, decoder module 214 decompresses, decodes and/or otherwise processes received content from stream select module 212 to extract an MPEG or other media stream encoded within the stream. The decoded content can then be processed by one or more display processor modules 218 to create a presentation on display 102 (FIG. 1) for the viewer in any appropriate format. FIG. 2 shows a single decoder module 214 operating on one television signal received from transport select module 212. In practice, any number of decoder modules 214 may be used, particularly in PIP settings where multiple signals are simultaneously decoded and displayed.

The term "decoder", then, may collectively apply to one or more decoder modules that are able to decode one or more signals for presentation on display 104.

Display processor module 218 includes any appropriate hardware, software and/or other logic to create desired screen displays via display interface 228 as desired. Such displays may include combining signals received from one or more decoder modules 214 to facilitate viewing of one or more channels. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with receiver 108 or the like. The generated displays, including received/stored content and any other displays may then be presented to one or more output interfaces 228 in any desired format. The various interface features described herein, for example, may be generated by display processor module 218 operating alone or in conjunction with control logic 205.

Display processor 218 produces an output signal encoded in any standard format (e.g., ITU656 format for standard definition television signals or any format for high definition television signals) that can be readily converted to standard and/or high definition television signals at interface 228. In other embodiments, the functionality of display processor 218 and interface 228 may be combined in any manner.

Figure 3:
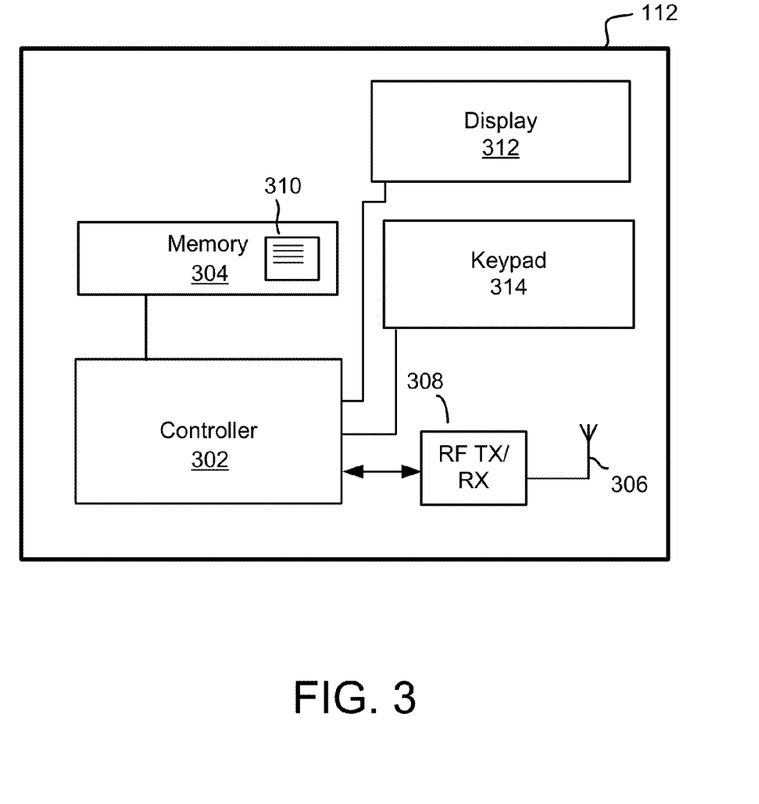
FIG. 3 is a block diagram of an exemplary remote control device.

FIG. 3 shows a conceptual block diagram of an exemplary remote control device 112. In general, device 112 includes a controller 302, a transceiver module 308, an antenna 306, input/output (I/O) components 312, and a memory 304.

Controller 302 may include any combination of circuitry, components, hardware, software and/or firmware logic capable of controlling the various components of remote control device 112 as described below. In one embodiment, for example, controller 302 is a standard microcontroller of the type well known in the art.

Memory 304—e.g., any of the various fixed or removeable non-volatile memory device—is configured to store one or more look-up tables or other such files 304 capable of storing remote control codes or other indicia necessary to control particular components (e.g., receiver 108). File 304 may or may not have the same content and format as file 211 in storage 110 of receiver 108.

Transceiver 308, which is coupled to controller 302 and antenna 306, is configured to establish a data communication channel with an external component such as receiver 108, as described in more detail below. In one embodiment, transceiver 308 and controller 302 are collectively configured to establish a wireless data communication channel of the type characterized by a mesh network—e.g., a ZigBee communication channel or the like.

User interface 312 collectively includes all the various buttons, touch-screens, keyboards, sliders, scroll-wheels, displays, and other such hardware and software used to allow a user to interact with remote control device 112. In one embodiment, for example, user interface 312 includes, among other things, two-dimensional touchpad-type device 124 and scroll regions 123 and 128.

Figure 4:
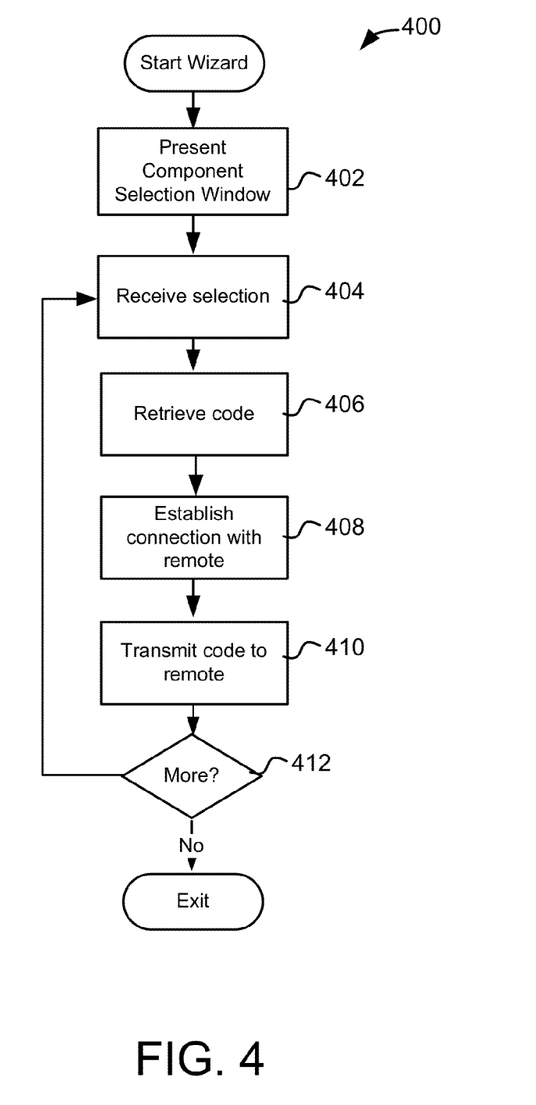
FIG. 4 is a flowchart showing an exemplary process for configuring the remote control device of FIG. 3.

FIG. 4 depicts a method for configuring a remote control device in accordance with an exemplary embodiment. In this regard, the steps shown in FIG. 4 may be executed using source or object code in any format that may be stored in mass storage, firmware, memory or any other digital storage medium within receiver 108 and/or remote control device 112. Such code may be executed by any module or combination of modules within each component.

Initially, a set-up "wizard" or other such software module is initialized, either by the user (for example, by pressing a button or otherwise interacting with user interface 312), or by another component pursuant to a set-up or initialization procedure. That is, it may be advantageous for receiver 108 and/or remote control device 112 to initiate a set-up procedure by default upon first being activated or powered-up.

Accordingly, in step 402, a component selection window or other such graphical scheme for component selection is presented to the user. In one embodiment, controller 205 of television receiver 108 acts in conjunction with software code stored within storage 220 to provide a step-by-step interactive procedure for configuring remote control device 112 utilizing display 102. For example, display 102 may used to present an interactive, selectable list of component types—i.e., various brands and model numbers of television monitors, AV receivers, and the like—from which the user may select a target component.

Upon receiving a selection (step 404), the system retrieves the appropriate code or codes from file 211 within storage 220 (step 406). That is, for example, if the user selects a "Samsung Model 550T" television set from the component selection window, controller 205 suitably interrogates file 211 for entries matching this particular component type.

Next, in step 408, a bi-directional data communication connection is established between remote control device 112 and receiver 108. This connection may take a variety of forms. In one embodiment, for example, the system establishes a wireless connection of the type configured to form a mesh network with other similarly situated devices. More particularly, in one embodiment a connection in accordance with the IEEE 802.15.4 (ZigBee) protocol is established between remote control device 112 and receiver 108. As is known, such a connection is bidirectional and asynchronous, and thus unlike traditional remote control schemes allows data to be transferred from receiver 108 to remote control device 112.

After a suitable connection is established, the target remote control codes retrieved in step 406 are sent via the data communication channel to remote control device 112 (step 410). These codes are then stored (e.g., as file 310 within memory 304) for subsequent use by remote control device 112 when remotely operating various components of the system.

After the code for a particular component has been received, the system may present the user with the option of configuring remote control device 112 for additional components (step 412). If the user chooses to do so, the system repeats the processing beginning at step 404. If not, the system exits the wizard and then enters a standard operational mode.

In accordance with further embodiments, remote control 112 may be used to store additional data transmitted by receiver 108. Such additional data may include, for example, parental guide settings, a list of received channels, a list of favorite channels, and any other available information regarding configuration of a home entertainment system.

Accordingly, new systems and techniques for configuring a remote control device are described. Although the systems and features are often described herein as applying to changing a channel within a set top box or television, equivalent embodiments could apply the same concepts to control of audio devices or any other component of the type typically operated by remote control.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method for configuring a remote control device, the method comprising:
   receiving a set of remote control codes via a broadcast television programming signal independent of any requests to a source of the broadcast television programming signal, wherein each of the set of remote control codes is associated with a different one of a plurality of different component types;
   storing, within a television receiver, the received set of remote control codes;
   presenting a component-selection user interface;
   receiving a target component type selected from the plurality of different component types using the component-selection user interface;
   determining, from the set of remote control codes, a target remote control code associated with the target component type;
   establishing a bi-directional data communication link between the remote control device and the television receiver, wherein the bi-directional data communication link includes a wireless protocol capable of forming a mesh network; and
   transmitting the target remote control code to the remote control device via the bi-directional data communication link.

2. The method of claim 1, wherein the bi-directional data communication link is a ZigBee network connection.

3. The method of claim 1, further including storing a plurality of the target remote control codes in the remote control device.

4. The method of claim 1, wherein presenting the component-selection user interface includes displaying a list of the different component types on a television monitor coupled to the television receiver.

5. The method of claim 4, wherein selecting the target component type includes operation of the remote control device.

6. The method of claim 1 further comprising receiving an update to the set of remote control codes via the broadcast television programming signal.

7. The method of claim 6 wherein the update is received via the broadcast television programming signal on a regular basis.

8. The method of claim 6 wherein the broadcast television programming signal is a cable television signal.

9. The method of claim 1 wherein the broadcast television programming signal is a digital broadcast satellite signal.

10. A remote control device comprising:
    a controller;
    an RF transceiver coupled to the controller;
    a memory coupled to the controller;
    the controller and RF transceiver collectively configured to establish a bi-directional connection with a television receiver, to receive a target remote control code over the bi-directional connection, and to store the target remote control code in the memory, wherein the target remote control code is received at the television receiver via a television downlink signal independent of any requests to a source of the broadcast television programming signal, wherein the bi-directional connection includes a wireless protocol capable of forming a mesh network.

11. The remote control device of claim 10, wherein the controller and RF transceiver are configured to establish a ZigBee connection with the television receiver.

12. The remote control device of claim 10 wherein the controller and RF transceiver are further configured to subsequently use the target remote control code to control a target component.

13. A television receiver configured to provide imagery to a television monitor, the television receiver comprising:
    a receiver interface configured to receive a broadcast television programming signal that includes a set of remote control codes, wherein each of the set of remote control codes is associated with a different one of a plurality of different component types;
    a processor;
    a storage unit coupled to the processor and configured to store a set of remote control codes associated with a plurality of component types; and
    a RF transceiver coupled to the processor;
    wherein the processor, storage unit, receiver interface and RF transceiver are collectively configured to receive the set of remote control codes via the broadcast television programming signal independent of any requests to a source of the broadcast television programming signal, to present a component-selection user interface on the television monitor, to receive a target component type selected via the component-selection user interface, to determine a target remote control code corresponding to the target component type based on the set of remote control codes, and to transmit the target remote control code to a remote control device via a bi-directional data communication link that comprises a wireless mesh network connection.

14. The television receiver of claim 13, wherein the bi-directional data communication link comprises a ZigBee connection.

15. The television receiver of claim 13 further comprising a decoder configured to decode the received broadcast television programming signals, wherein the broadcast television programming signals are digital broadcast television programming signals.

16. The television receiver of claim 15 wherein the receiver is further configured to receive an update to the set of remote control codes via the receiver interface.

17. The television receiver of claim 13 wherein the receiver interface is a satellite interface.

* * * * *